(12) United States Patent
Kim et al.

(10) Patent No.: US 6,517,604 B1
(45) Date of Patent: Feb. 11, 2003

(54) APPARATUS AND METHOD FOR MEASURING THE MOLTEN METAL LEVEL IN ELECTROMAGNETIC CONTINUOUS CASTING

(75) Inventors: Goo-Hwa Kim, Pohang-si (KR); Ki-Jang Oh, Pohang-si (KR); Ho-Young Kim, Pohang-si (KR); Dong-Jun Shim, Pohang-si (KR)

(73) Assignees: Pohang Iron & Steel Co., Ltd. (KR); Research Institute of Industrial Science & Technology (KR)

( * ) Notice: Subject to any disclaimer, the term of this patent is extended or adjusted under 35 U.S.C. 154(b) by 0 days.

(21) Appl. No.: 09/787,187

(22) PCT Filed: Jul. 18, 2000

(86) PCT No.: PCT/KR00/00780
§ 371 (c)(1),
(2), (4) Date: Mar. 15, 2001

(87) PCT Pub. No.: WO01/06217
PCT Pub. Date: Jan. 25, 2001

(30) Foreign Application Priority Data

Jul. 16, 1999 (KR) .............................. 99-28920
Jul. 6, 2000 (KR) ........................ 2000-38702

(51) Int. Cl.$^7$ ............................... B22D 11/16
(52) U.S. Cl. .................... 75/386; 164/449.5; 164/450.5; 164/452; 164/453; 266/80; 266/94
(58) Field of Search .......................... 164/449.5, 450.5, 164/452, 453; 75/386; 266/80, 94

(56) References Cited

U.S. PATENT DOCUMENTS 4,446,562 A    5/1984   Friedmann et al.
4,555,941 A   12/1985   Fathauer et al.
4,567,435 A    1/1986   Yamada et al.
6,337,566 B1 * 1/2002   Fujisaki et al. .......... 164/450.5

FOREIGN PATENT DOCUMENTS

| JP | (1983) 60-127060 A2 | 7/1985 |
| JP | (1986) 63-104758 A2 | 5/1988 |
| JP | (1992) 6-122056 A2 | 5/1994 |
| JP | (1997)11-188465 A2 | 7/1999 |
| KR | (1999) 99-28920 | 2/2001 |

OTHER PUBLICATIONS

Seiji Furuhashi et al., "Control of Early Solidification by the Use of High Frequency Electromagnetic Field in the Continuous Casting of Steel", *Corporate Research and Development Laboratories, Sumisomo Metal Industries, Ltd.*, Jun. 4, 1998, pp. 17–23 (English synopsis).

* cited by examiner

*Primary Examiner*—Melvyn Andrews
(74) *Attorney, Agent, or Firm*—Webb Ziesenheim Logsdon Orkin & Hanson, P.C.

(57) ABSTRACT

An apparatus and method for measuring the level of a free surface of molten metal in an electromagnetic continuous casting process using an AC electromagnetic field. A detection coil is provided to detect the sum of a magnetic field applied from an induction coil and an induced magnetic field based on eddy current in the molten metal. An arithmetic unit is provided to detect the surface level of the molten metal by removing a variation of the applied magnetic field with a variation in current to the induction coil from an output signal from the detection coil. The surface level of the molten metal can be accurately measured by determining whether a variation in the output of the detection coil results from a variation in the applied magnetic field or a variation in the surface level of the molten metal.

12 Claims, 5 Drawing Sheets

APPARATUS AND METHOD FOR MEASURING THE MOLTEN METAL LEVEL IN ELECTROMAGNETIC CONTINUOUS CASTING

TECHNICAL FIELD

The present invention relates in general to an apparatus and method for measuring the level of molten metal in an electromagnetic continuous casting process, and more particularly to an apparatus and method for measuring the level of the surface of molten metal in an electromagnetic continuous casting process using an alternating current (AC) electromagnetic field.

BACKGROUND OF THE INVENTION

As well known to those skilled in the art, an electromagnetic continuous casting process is a technique for applying an electromagnetic field across the surface of molten metal and casting the molten metal using an electromagnetic force and Joule heat induced due to the applied electromagnetic field. In this technique, a part of the molten metal to be initially solidified is heated by the Joule heat and then slowly cooled, resulting in the formation of a thin, initial solid shell under the surface of the molten metal, thereby making it difficult to form an oscillation mark (OM). Further, because a contact angle between a casting mold and the molten metal surface is increased due to the electromagnetic force, the initial solid shell is less influenced by a mold oscillation, resulting in an improvement in surface characteristic of a cast product. On the other hand, such an electromagnetic continuous casting process is adapted to apply a strong AC electromagnetic field across a free surface (referred to hereinafter as surface) of the molten metal differently from existing processes, which field is induced by applying AC current to an induction coil installed in a place outside the casting mold where the molten metal surface is to be positioned.

In the above-mentioned electromagnetic continuous casting process, the surface of the molten metal is an important factor in determining the surface state of a cast product and must thus be finely controlled to maintain the surface state of the cast product better. For this reason, it is very important to accurately measure the surface level of the molten metal. In the case where the surface of the molten metal is beyond a desired level, a remarkable OM is formed on the surface of a continuous cast product, which may lead to a serious defect in the subsequent process. In this regard, the surface level of the molten metal in the electromagnetic continuous casting process must be more strictly managed than in general casting processes. It is generally known in the art that the surface characteristic of a cast product is most excellent when the surface of the molten metal has the same height as that of the top end of the induction coil.

For measuring the surface level of molten metal in existing steel continuous casting processes, there have conventionally been proposed a method using radioactive rays incapable of being transmitted through the molten metal, a method using an eddy current sensor (see U.S. Pat. No. 4,567,435, 1987), a method using an electrostatic capacity sensor (see U.S. Pat. No. 4,555,941, 1985), etc. However, these methods cannot be used for the electromagnetic continuous casting process where a strong AC electromagnetic field is present on the surface area of the molten metal, because their measuring devices are subjected to heating or restrictions in space. The method based on the eddy current sensor is desirable to finely measure the surface level of the molten metal, but disadvantageous in that the eddy current sensor is positioned within a mold. Namely, when a strong electromagnetic field is applied to the surface area of the molten metal as in the electromagnetic continuous casting process, the eddy current sensor is magnetically saturated and thus loses its function as the sensor. The method based on the electrostatic capacity sensor is subjected to a strict restriction in space because no conductive material having an effect on electric potential must be present within the range of a distance between an electrode and the surface of the molten metal. Further, because the electrostatic capacity sensor is considerably influenced by a dielectric constant of powder in the surface of the molten metal in casting the molten metal, its output varies with the thickness of the powder, resulting in the generation of an error within a very wide range. Moreover, a conductive material, which has to be installed relatively near the surface of the molten metal, may be induction-heated by the strong electromagnetic field in the electromagnetic continuous casting, thereby causing it not to act as the sensor. Similarly, in the method based on the radioactive rays, a proposed device cannot perform its own function due to the induction heating by the electromagnetic field.

For measuring the surface level of molten metal in the electromagnetic continuous casting process, there have conventionally been available a method using a frequency variation of an external induction coil for applying an electromagnetic field (see U.S. Pat. No. 4,446,562, 1984), a method using an inductance variation of an induction coil (see Japanese Patent Laid-Open Publication No. Heisei 6-122056), etc. An electric load in electromagnetic continuous casting equipment including an induction coil, a casting mold, molten metal, etc. basically varies with the surface level of the molten metal. As a result, there are variations in a voltage from a power supply device to the induction coil and associated current, inductance and frequency. The above methods are adapted to measure the surface level of the molten metal using such a phenomenon. However, the measuring performance is excellent when the surface of the molten metal is within the range of the induction coil, but abruptly degraded when the surface of the molten metal is beyond the range of the induction coil. This requires a band for measurement of the surface level of the molten metal to be limited to the range of the induction coil.

One approach to such a problem is the extension of the surface level measuring band by an auxiliary coil installed above the induction coil. In this approach, however, the measuring band is limited to a range defined by the two coils, too (see Iron and Steel, Vol. 84, p 625, 1998). In a method of measuring an inductance variation of an induction coil using a detection coil, shown in Japanese Patent Laid-Open Publication No. Heisei 6-122056, values measured by the detection coil involve influences resulting from voluntary variations in current to the induction coil with casting conditions. As a result, it is unreasonable to apply the measured values to the accurate measurement of the surface level of the molten metal without correcting such variations.

Another approach is a method using a magnetic field sensor (see Korea Patent Application No. 99-28920), which is applicable to the measurement of the surface level of molten metal in the electromagnetic continuous casting process in that the magnetic field sensor has an excellent sensitivity and a wide detection band. However, a considerable degree of error may occur in the measured result in the case where current to an induction coil is severe in variation.

SUMMARY OF THE INVENTION

Accordingly, the present invention has been made keeping in mind the above problems occurring in the prior art, and an object of the present invention is to provide an apparatus and method for measuring the level of the surface of molten metal in an electromagnetic continuous casting process, which can effectively remove noise components generated from a power supply device of an electromagnetic continuous casting machine and external noise components, accurately measure the surface level of the molten metal and provide molten metal surface level data appropriate to other equipment in accordance with the accurate measurement.

In accordance with one aspect of the present invention, the above and other objects can be accomplished by a provision of an apparatus for measuring the level of the surface of molten metal within a mold in an electromagnetic continuous casting process by detecting a magnetic field applied from an induction coil and an induced magnetic field based on eddy current in the molten metal, comprising power supply means for supplying predetermined AC power to the induction coil and setting a power variable indicative of a variation in the AC power; a detection coil for detecting the sum of the applied magnetic field from the induction coil and the induced magnetic field; amplification/filtering means for amplifying an output signal from the detection coil to a predetermined level and filtering the amplified signal to remove noise components therefrom; and an arithmetic unit responsive to an output signal from the amplification/filtering means and the power variable from the power supply means for detecting the surface level of the molten metal by removing components of the applied magnetic field based on the variation in the AC power to the induction coil from the magnetic field sum detected by the detection coil.

In accordance with another aspect of the present invention, there is provided a method for measuring the level of the surface of molten metal within a mold in an electromagnetic continuous casting process by detecting the sum of a magnetic field applied from an induction coil and an induced magnetic field based on eddy current in the molten metal through a detection coil, comprising the first step of amplifying an output signal from the detection coil to a predetermined level and filtering the amplified signal to remove noise components therefrom; and the second step of determining the surface level of the molten metal by removing components of the applied magnetic field based on a variation in current to the induction coil from the amplified and filtered signal.

DETAILED DESCRIPTION OF THE INVENTION

The above and other objects, features and other advantages of the present invention will be more clearly understood from the following detailed description taken in conjunction with the accompanying drawings, in which.

DETAILED DESCRIPTION OF THE INVENTION

Figure 1:
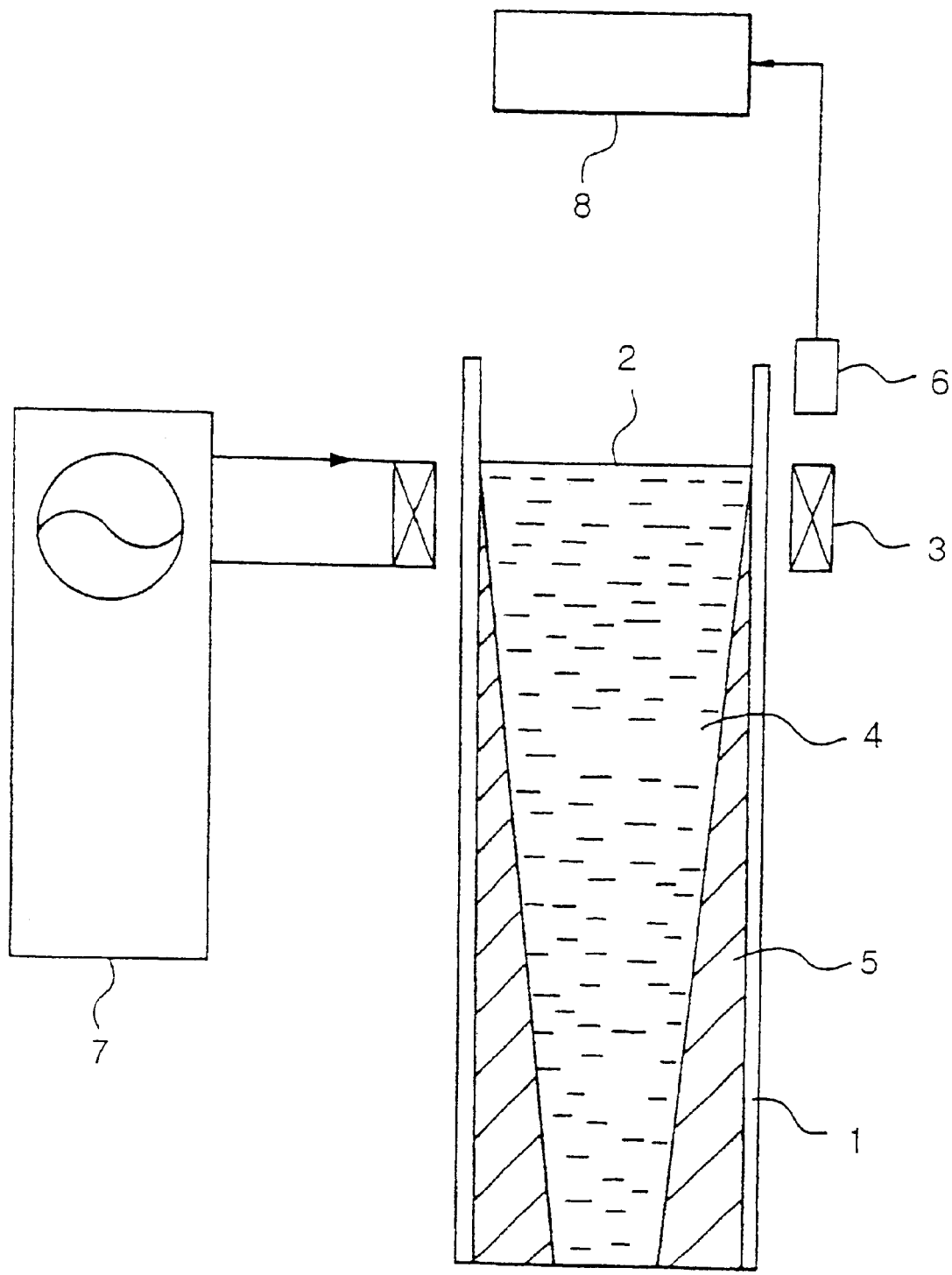
FIG. 1 is a view showing the construction of an apparatus for measuring the level of the surface of molten metal in an electromagnetic continuous casting process in accordance with the present invention.

FIG. 1 is a view schematically showing the construction of an apparatus for measuring the level of the surface of molten metal in an electromagnetic continuous casting process in accordance with the present invention. As shown in this drawing, the surface level measurement apparatus comprises an induction coil 3 installed apart from a mold 1 for generating a magnetic field in response to AC current applied thereto and applying the generated magnetic field to molten metal 4 within the mold 1, a power supply device 7 for applying the AC current to the induction coil 3, a detection coil 6 for detecting the magnetic field generated by the induction coil 3 and a magnetic field induced by eddy current generated in the molten metal 4 according to the applied magnetic field, and level detection means 8 for detecting the surface level of the molten metal 4 from the sum of the magnetic fields detected by the detection coil 6.

Preferably, the power supply device 7 may apply AC current of several ten to several hundred KHz and several thousand A to the induction coil 3. Further, the magnetic field generated by the induction coil 3 and the magnetic field induced by the eddy current generated in the molten metal 4 may be AC magnetic fields of the same frequency.

If the power supply device 7 applies the AC current to the induction coil 3, then the induction coil 3 applies a magnetic field to the molten metal 4 through the mold 1, resulting in the generation of eddy current in the molten metal 4 and, in turn, the generation of an induced magnetic field based on the eddy current. The detection coil 6 measures the sum of the applied magnetic field and induced magnetic field and detects the surface level of the molten metal in accordance with the measured result.

The level detection means 8 removes noise components from a level detection signal from the detection coil 6 and measures the surface level of the molten metal on the basis of the noise-removed level detection signal. The level detection means 8 is further adapted to stably control the surface level of the molten metal for the stable formation of a solid shell, thereby improving the surface quality of a cast product.

The detection coil 6 may preferably be configured to measure a magnetic field parallel to the axis of the mold 1, a magnetic field perpendicular to the mold axis or the combination of the magnetic fields parallel and perpendicular to the mold axis. In order to detect such a magnetic field, the detection coil 6 may preferably be installed at a position outside the upper portion of the mold 1 or at a position above the induction coil 3 (i.e., at a position around the upper portion of the mold 1). Although the detection coil 6 is shown in the preferred embodiment of the present invention to be installed at a position around the upper portion of the mold 1, those skilled in the art will appreciate that the detection coil 6 is not limited to such a position.

Figure 2:
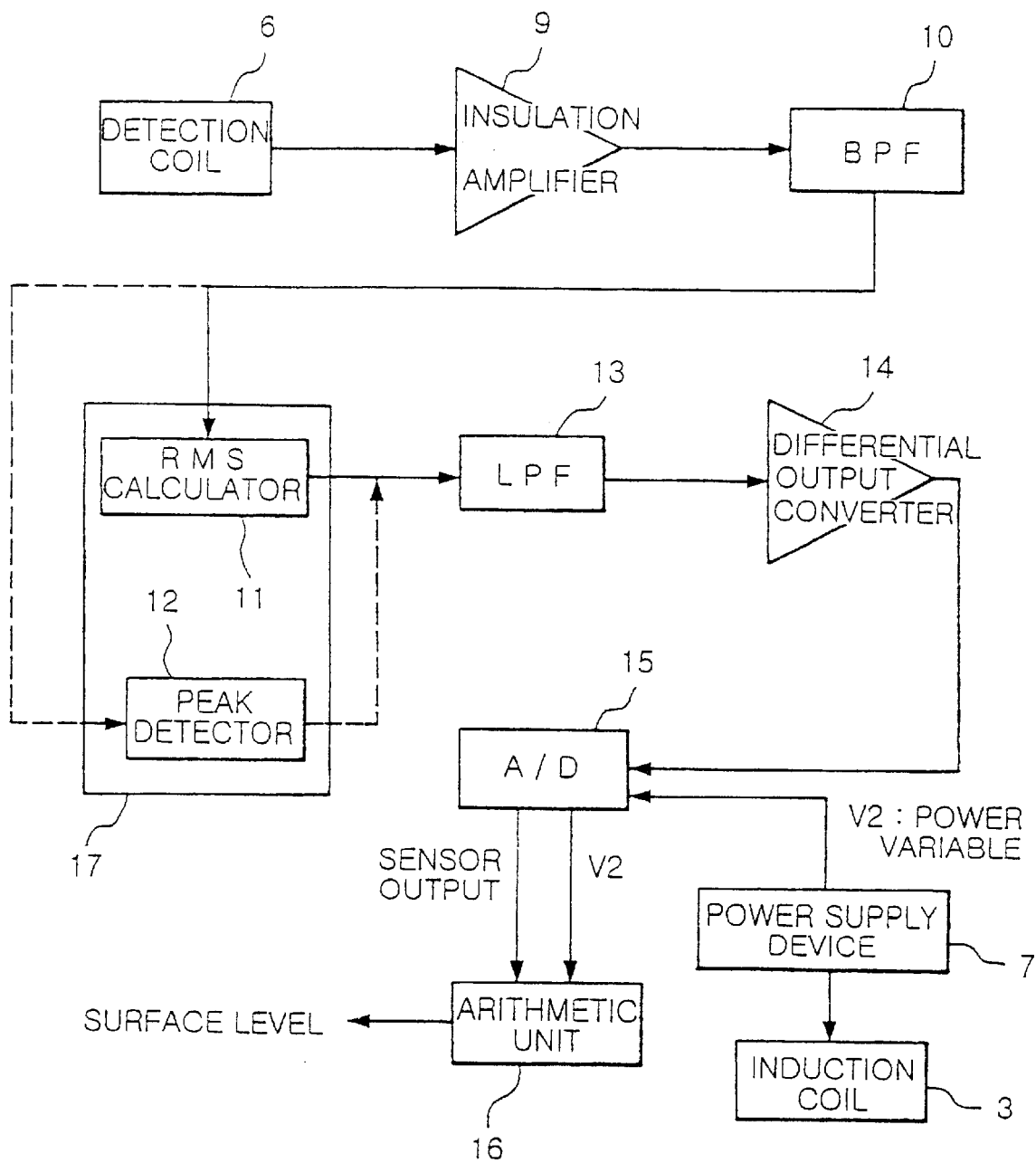
FIG. 2 is a block diagram showing the construction of level detection means in FIG. 1.

FIG. 2 is a block diagram in detail showing the construction of the level detection means 8 in FIG. 1. As shown in this drawing, the level detection means 8 includes an isolation amplifier 9 for amplifying an output signal from the detection coil 6 to a predetermined level. Noticeably, an external high noise may be introduced in the detection coil 6 because the coil has a coiled shape, and a general differential amplifier cannot remove a common mode noise of 10V or more. In this regard, the isolation amplifier 9 may preferably be used for system protection and stable amplification.

It should also be noted that it is necessary to acquire only signal components within a specific frequency range required for level measurement from an output signal from the isolation amplifier 9 because this signal contains noise components resulting from electrical fluctuations of the power supply device. For this reason, a band pass filter (BPF) is provided to remove noise components from the output signal from the isolation amplifier 9. An output signal from the BPF 10 still has an AC signal characteristic. In order to utilize such a signal for the control of the surface level of the molten metal, a direct current (DC) signal converter 17, which is composed of either a root mean square (RMS) calculator 11 or a peak detector 12 must be used to convert that signal into a DC signal within a predetermined period of time. An output signal from the RMS calculator 11 or peak detector 12 still has high-frequency noise components. In this regard, a low pass filter (LPF) 13 is used to remove noise components from the output signal from the RMS calculator 11 or peak detector 12. The noise-removed surface level detection signal from the detection coil 6 may be transmitted by long distance according to a given condition. To this end, a differential output converter 14 is used to amplify an output signal from the LPF 13 to a predetermined level. An analog/digital (A/D) converter 15 is adapted to convert an analog output signal from the differential output converter 14 into a digital signal. As a result, the A/D converter 15 sends a signal with no noise component to an arithmetic unit 16.

The arithmetic unit 16 is adapted to determine the surface level of the molten metal on the basis of the measured value from the detection coil 6, converted into the digital signal by the A/D converter 15. Herein, the detection coil 6 is adapted to detect the surface level of the molten metal according to the principle as will hereinafter be described in detail.

The fundamental principle of the detection coil 6 is to use electromagnetic induction. Namely, an AC magnetic field is applied to the molten metal using a power supply device of an electromagnetic continuous casting machine and an induced magnetic field is generated in the molten metal by means of the applied AC magnetic field. Then, the detection coil 6 measures the surface level of the molten metal by detecting the sum of the applied magnetic field and induced magnetic field.

If a magnetic field varying with time is applied across a conductive material, then an electromotive force $\epsilon$ is generated in the conductive material due to a magnetic field B perpendicular to the material, as in the below equation 1. Then, an induced current circuit obeying the Ohm's law is formed on a circuitry where the electromotive force is generated.

$$\varepsilon = -\frac{d}{dt}\int_c B \cdot n \, da \qquad \text{[Equation 1]}$$

The direction of an induced magnetic field generated by induced current varies with that of an external magnetic field which is applied to a conductive material to maintain the induced magnetic field constant in the conductive material. That is, the direction of the induced magnetic field is opposite to that of the applied magnetic field, as seen from a minus sign in the above equation 1.

The detection coil 6 may preferably be a search coil-type magnetic sensor for measuring a magnetic field by measuring an electromotive force induced therein. Namely, the detection coil 6 measures the surface level of the molten metal by measuring an induced magnetic field based on a current loop formed in the surface of the molten metal. A time-variation rate of a magnetic flux crossing an area surrounded by the detection coil 6 is the sum of a time-variation rate of an applied magnetic field $B^e_p$ based on current through the induction coil and a time-variation rate of an induced magnetic field $B^i_p$ based on current induced in the molten metal. As a result, the output (V1) of the detection coil 6 can be expressed by the following equation 2.

$$V1 = -\frac{d}{dt}\int_c (B^e_p + B^i_p) \cdot n \, da \qquad \text{[Equation 2]}$$

The magnetic field sum, measured by the detection coil 6 in the above manner, is amplified to a predetermined level and noise-removed by the above-mentioned amplification and filtering means and then transferred to the arithmetic unit 16 for the determination of the surface level of the molten metal.

The arithmetic unit 16 removes the components of said applied magnetic field induced due to the variation on the current applied by the power supply device from the magnetic field sum detected by said detection coil on the basis of the below equation 3 to detect the surface level of the molten metal depending on, not a variation of the applied magnetic field but a variation in position of the surface of the molten metal.

$$\text{SURFACE LEVEL} = \frac{1}{k}\left[-\ln\frac{a - V_1}{a - b}\right]^{\frac{1}{d}} \qquad \text{[Equation 3]}$$

In the above equation 3, a=C1*V2+C2, b=C3*V2+C4, d=C5*V2+C6, k=C7, V1=magnetic field sum and C1, C2, C3, C4, C5, C6 and C7=constants associated with the value of V2. V2 is directly related to the power or the current applied to the induction coil. In other words, in the above equation 3, the variable a represents the lowest surface level (for example, 300 mm) of the molten metal in a detection area of the detection coil 6, the variable b represents the highest surface level (for example, 0 mm) and the variable d represents the surface level when the slope of an induced magnetic field graph, which will be mentioned later in detail, is k.

A strong magnetic field induced by the induction coil is present in the surface area of the molten metal according to the characteristic of the electromagnetic continuous casting. In this connection, the detection coil concurrently measures a magnetic field applied by the induction coil and an induced magnetic field based on eddy current generated in the molten metal.

As stated previously, an electric load in electromagnetic continuous casting equipment and, thus, the amount of current from the power supply device to the induction coil vary with the surface position of the molten metal. As a result, there is also a variation in the applied magnetic field based on the induction coil current. The applied magnetic field is directly influenced by a variation in the amount of current to the induction coil in the electromagnetic continuous casting process. For this reason, the applied magnetic field components must be removed from a magnetic field measured around the surface of the molten metal, to ensure that the surface level of the molten metal is accurately measured in the electromagnetic continuous casting process.

On the other hand, the induced magnetic field contains both a component varying with the applied magnetic field when the surface of the molten metal is changed in position and a component varying with the surface position of the molten metal even though the applied magnetic field is constant. This signifies that the surface position of the molten metal can be accurately detected by determining whether a variation in the output of the detection coil results from a variation in the applied magnetic field or a variation in the surface level of the molten metal.

In the present embodiment, a power variable V2 is used to correct a variation in the applied magnetic field based on a variation in the induced magnetic field from the output of the detection coil. The V2 is a variable capable of being representative of the applied magnetic field and provided from the power supply device supplying power to the induction coil. Also, the power variable V2 is irrelevant to a variation in surface position of the molten metal and a variation in electric load in the electromagnetic continuous casting process and one-to-one corresponds to a current value impressed on the induction coil. The power variable V2 may preferably be set to AC current, voltage or power that the power supply device supplies to the induction coil.

Figure 3:
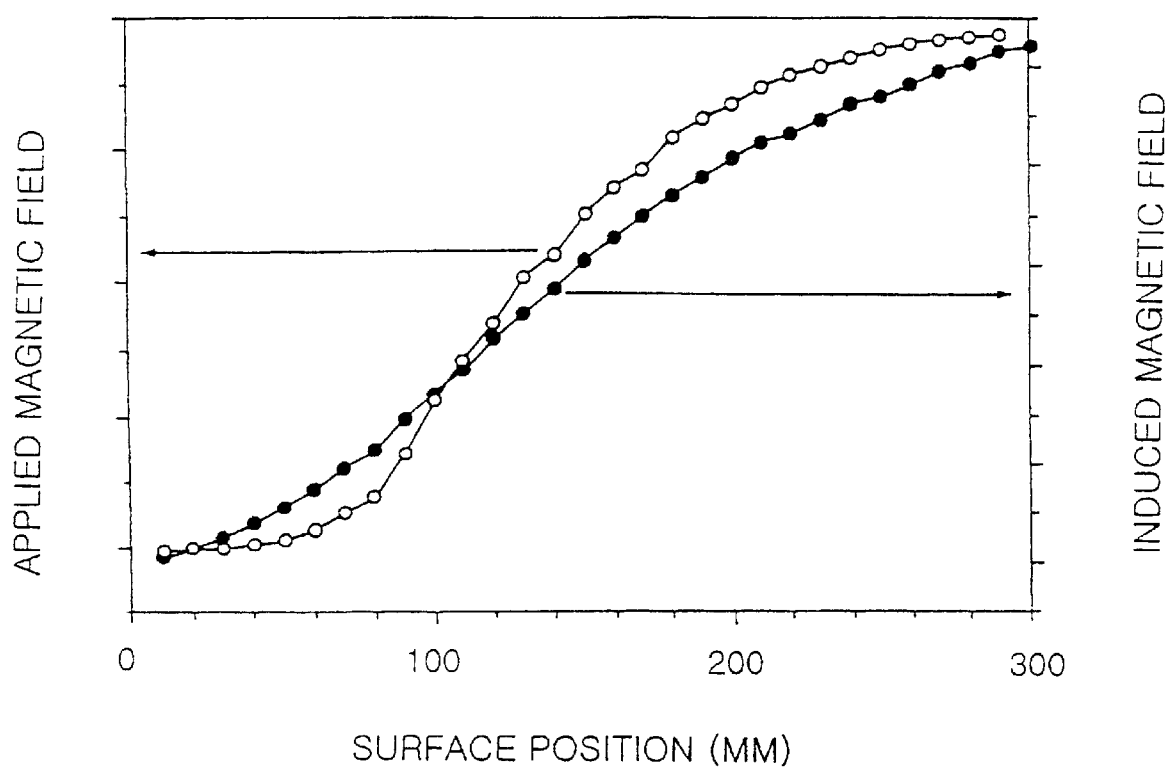
FIG. 3 is a graph showing variations of a magnetic field applied to the molten metal and a magnetic field induced in the molten metal by the applied magnetic field in accordance with the present invention.

FIG. 3 is a graph showing the comparison between a variation in the applied magnetic field and a variation in the induced magnetic field with a variation in the surface position of the molten metal. As shown in this drawing, the applied magnetic field is narrow in detection band whereas the induced magnetic field is wide in detection band.

As seen from the above equation 3, the power variable V2 from the power supply device is contained respectively in the variables a, b and d. This makes it possible to remove influences of a variation in the applied magnetic field with a voluntary variation in the induction coil current depending on a given casting condition and a variation in the applied magnetic field with a variation in the surface position of the molten metal. In other words, in the present embodiment, the arithmetic unit measures the surface position of the molten metal by separating only the value of a variation in the induced magnetic field resulting from a variation in the surface position from the output signal from the A/D converter. Hence, the arithmetic unit can stably measure the surface level of the molten metal even though the amount of induced current to the induction coil voluntarily varies in the electromagnetic continuous casting process as needed.

Figure 4:
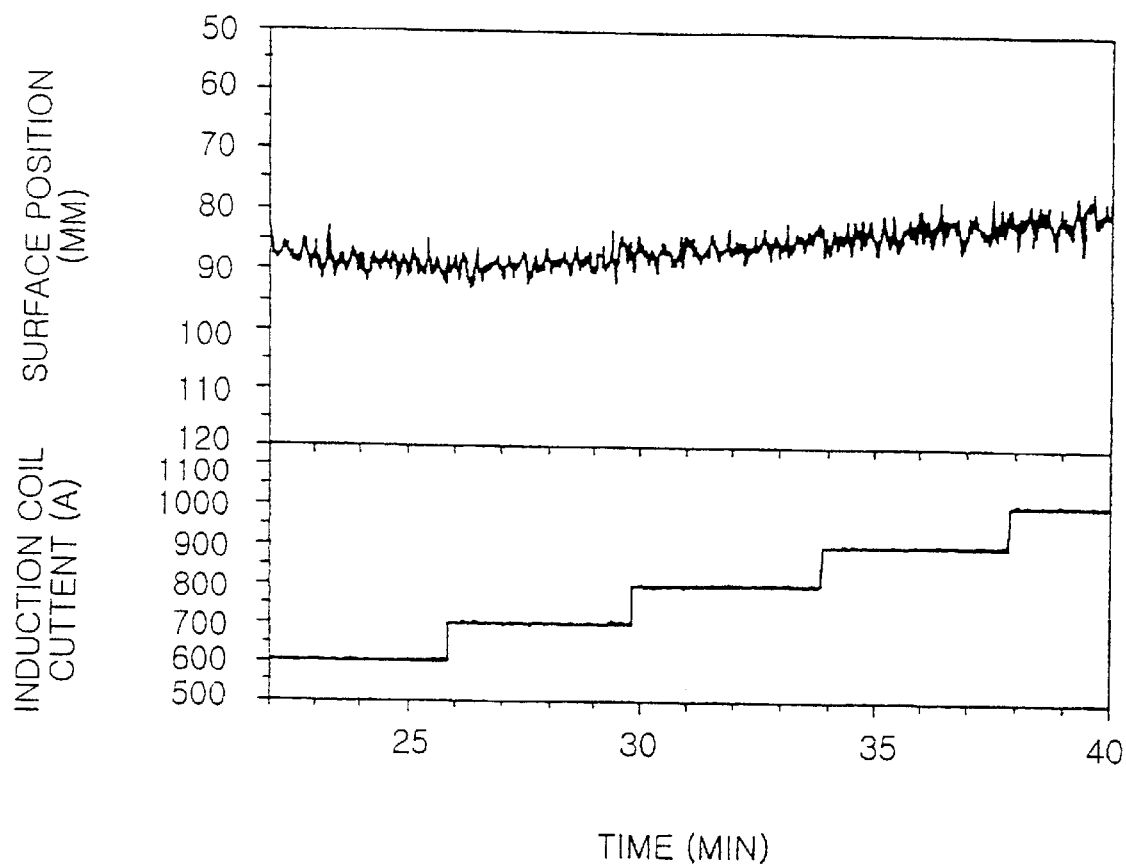
FIG. 4 is a graph showing the measured results of the surface level of the molten metal based on current variations of an induction coil in accordance with the present invention.

FIG. 4 is a graph showing the measured results of the surface level of the molter metal based on current variations of the induction coil in accordance with the preferred embodiment of the present invention. In the case where a regulated voltage or current, which is one of self electrical signals of the power supply device, is extracted and applied to the level detection means, an abrupt variation in current to the induction coil or an abrupt variation in the applied magnetic field has no effect on the measured results of the surface level of the molten metal as seen from FIG. 4. It can also be seen from FIG. 4 that the surface position of the molten metal slowly varies within the range of 80 to 90 mm. This is based on the fact that the surface position of the molten metal varies through the process to prevent a nozzle for injection of the molten metal from being corroded.

Figure 5:
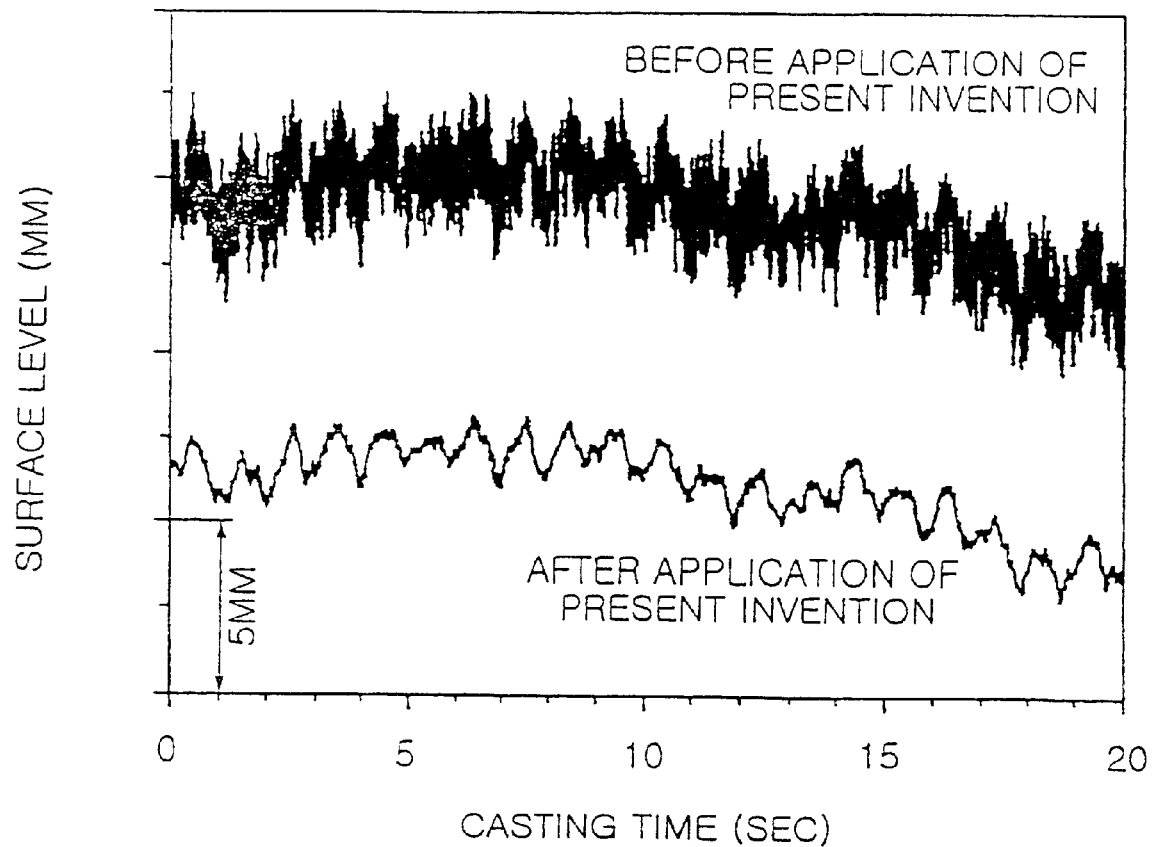
FIG. 5 is a graph showing an example of the measured results of the surface level of the molten metal in accordance with the present invention.

FIG. 5 is a graph showing an example of the measured results of the surface level of the molten metal in accordance with the present invention. As shown in this drawing, the measured level value has an improved noise value of about 0.3 mm in the present case as compared with a noise value of about 4 mm in the conventional case. Therefore, it can be seen that the level measurement accuracy has been significantly enhanced according to the present invention. On the other hand, a signal oscillates on the order of once a second after the present invention is applied to the level measurement. Such a signal is based on the self-oscillation of the mold and represents a variation in the surface level of the molten metal.

As apparent from the above description, according to the present invention, the surface level of molten metal can be accurately measured irrespective of variations in current and voltage from a power supply device to an induction coil by removing components of an applied magnetic field from the induction coil from the output of a detection coil detecting the applied magnetic field and an induced magnetic field based on a variation in surface position of the molten metal.

Further, according to the present invention, the surface level of the molten metal can be stably measured at a high accuracy and thus used as a reference signal for the surface level control. Therefore, the surface quality of a cast product can be increased, thereby reducing the length of a manufacturing process for steel products and saving energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring the level of the surface of molten metal within a mold in an electromagnetic continuous casting process by detecting a magnetic field applied from an induction coil and an induced magnetic field based on eddy current in the molten metal, comprising:

power supply means for supplying predetermined AC power to said induction coil and setting a power variable indicative of a variation in the AC power;

a detection coil for detecting the sum of said applied magnetic field from said induction coil and said induced magnetic field;

amplification/filtering means for amplifying an output signal from said detection coil to a predetermined level and filtering the amplified signal to remove noise components therefrom; and an arithmetic unit responsive to an output signal from said amplification/filtering means and said power variable from said power supply means for detecting the surface level of said molten metal by removing components of said applied magnetic field induced due to the variation in said AC power applied to said induction coil from said magnetic field sum detected by said detection coil.

2. The apparatus as set forth in claim 1, wherein said amplification/filtering means includes:

an isolation amplifier for amplifying the output signal from said detection coil to said predetermined level;

a band pass filter for filtering only signal components of a predetermined band from an output signal from said isolation amplifier;

a DC signal converter for converting an output signal from said band pass filter into a DC signal;

a low pass filter for filtering the DC signal from said DC signal converter to remove noise components therefrom; and an analog/digital converter for converting an analog output signal from said low pass filter into a digital signal and outputting the converted digital signal to said arithmetic unit.

3. The apparatus as set forth in claim 1, wherein said arithmetic unit is adapted to detect the surface level of said molten metal by removing the components of said applied magnetic field induced due to the variation in said AC power applied to said induction coil from said magnetic field sum detected by said detection coil on the basis of the following equation:

$$\text{SURFACE LEVEL} = \frac{1}{k}\left[-\ln\frac{a-V_1}{a-b}\right]^{\frac{1}{d}}$$

where, a=C1*V2+C2, b=C3*V2+C4, d=C5*V2+C6, k=C7, V1=magnetic field sum, V2=power variable and C1, C2, C3, C4, C5, C6 and C7=constants.

4. The apparatus as set forth in claim 1, wherein said power supply means is adapted to set said power variable according to the variation in said AC power to said induction coil, said power variable being irrelevant to a variation in surface position of said molten metal and a variation in electric load in said electromagnetic continuous casting process and one-to-one corresponding to a current value impressed on said induction coil.

5. The apparatus as set forth in claim 1, wherein said detection coil is in stalled at a position around an upper portion of said mold.

6. The apparatus as set forth in claim 1, wherein said detection coil is configured to measure any one of a magnetic field parallel to the axis of said mold, a magnetic field perpendicular to said mold exist and the combination of the magnetic fields parallel and perpendicular to said mold axis.

7. The apparatus as set forth in claim 3, wherein said power supply means is adapted to set said power variable according to the variation in said AC power to said induction coil, said power variable being irrelevant to a variation in surface position of said molten metal and a variation in electric load in said electromagnetic continuous casting process and one-to-one corresponding to a current value impressed on said induction coil.

8. The apparatus as set forth in claim 5, wherein said detection coil is configured to measure any one of a magnetic field parallel to the axis of said mold, a magnetic field perpendicular to said mold axis and the combination of the magnetic fields parallel and perpendicular to said mold axis.

9. A method for measuring the level of the surface of molten metal within a mold in an electromagnetic continuous casting process by detecting the sum of a magnetic field applied from an induction coil and an induced magnetic field based on eddy current in the molten metal through a detection coil, comprising the steps of:

a) amplifying an output signal from said detection coil to a predetermined level and filtering the amplified signal to remove noise components therefrom; and b) determining the surface level of said molten metal by removing components of said applied magnetic field induced due to a variation in current applied to said induction coil from the amplified and filtered signal.

10. The method as set forth in claim 9, wherein said surface level determination step b) includes the step of detecting the surface level of said molten metal by removing the components of said applied magnetic field induced due to the variation in said AC power applied to said induction coil from said magnetic field sum detected by said detection coil on the basis of the following equation:

$$\text{SURFACE LEVEL} = \frac{1}{k}\left[-\ln\frac{a-V_1}{a-b}\right]^{\frac{1}{d}} \quad \text{[Equation 3]}$$

where, a=C1*V2+C2, b=C3*V2+C4, d=C5*V2+C6, k=C7, V1=magnetic field sum, V2=power variable from power supply means and C1, C2, C3, C4, C5, C6 and C7=constants.

11. The method as set forth in claim 7, wherein said power supply means is adapted to set said power variable according to a variation in AC power to said induction coil, said power variable being irrelevant to a variation in surface position of said molten metal and a variation in electric load in said electromagnetic continuous casting process and one-to-one corresponding to a current value impressed on said induction coil.

12. The method as set forth in claim 10, herein said power supply means is adapted to set said power variable according to a variation in AC power to said induction coil, said power variable being irrelevant to a variation in surface position of said molten metal and a variation in electric load in said electromagnetic continuous casting process and one-to-one corresponding to a current value impressed on said induction coil.

* * * * *

UNITED STATES PATENT AND TRADEMARK OFFICE
CERTIFICATE OF CORRECTION

PATENT NO.    : 6,517,604 B1
DATED         : February 11, 2003
INVENTOR(S)   : Goo-Hwa Kim et al.

Page 1 of 1

It is certified that error appears in the above-identified patent and that said Letters Patent is hereby corrected as shown below:

Column 3,
Lines 50-51, heading, "Detailed Description of the Invention" should read
-- Brief Description of the Drawings --.

Column 5,
Line 14, "(BPF) is" should read -- (BPF) 10 is --.

Column 7,
Line 52, "molter metal" should read -- molten meal --.

Column 9,
Line 28, "is in stalled" should read -- is installed --.
Line 33, "mold exist" should read -- mold axis --.

Column 10,
Line 31, "set forth in claim 7" should read -- set forth in claim 9 --.
Line 39, first line, "herein" should read -- wherein --.

Signed and Sealed this

Twenty-second Day of July, 2003

JAMES E. ROGAN
*Director of the United States Patent and Trademark Office*